US012359570B2

(12) United States Patent
Jain et al.

(10) Patent No.: US 12,359,570 B2
(45) Date of Patent: Jul. 15, 2025

(54) COMPOSITE AIRFOIL ASSEMBLY FOR A TURBINE ENGINE

(71) Applicant: GENERAL ELECTRIC COMPANY, Schenectady, NY (US)

(72) Inventors: Nitesh Jain, Bangalore (IN); Nicholas Joseph Kray, Mason, OH (US); Abhijeet Jayshingrao Yadav, Bangalore (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/496,060

(22) Filed: Oct. 27, 2023

(65) Prior Publication Data

US 2025/0137378 A1 May 1, 2025

(51) Int. Cl.
*F01D 5/28* (2006.01)
*F01D 9/04* (2006.01)

(52) U.S. Cl.
CPC ............ *F01D 5/282* (2013.01); *F01D 9/041* (2013.01); *F05D 2220/36* (2013.01); *F05D 2300/6034* (2013.01)

(58) Field of Classification Search
CPC ..... F01D 5/00; F01D 5/12; F01D 5/14; F01D 5/147; F01D 5/28; F01D 5/282; F01D 9/041; F05D 2300/603; F05D 2300/6033; F05D 2300/6034; F05D 2220/36; F05D 2260/96
See application file for complete search history.

(56) References Cited

U.S. PATENT DOCUMENTS

| | | | | |
|---|---|---|---|---|
| 5,279,892 | A | 1/1994 | Baldwin et al. | |
| 7,241,112 | B2 | 7/2007 | Dambrine et al. | |
| 7,364,407 | B2 | 4/2008 | Grabau et al. | |
| 8,105,042 | B2 | 1/2012 | Parkin et al. | |
| 8,419,374 | B2 | 4/2013 | Huth et al. | |
| 8,662,855 | B2 | 3/2014 | Naik et al. | |
| 8,696,319 | B2 | 4/2014 | Naik | |
| 9,080,454 | B2 | 7/2015 | Coupe et al. | |
| 10,145,039 | B2 | 12/2018 | Marchal et al. | |
| 12,000,303 | B2 | 6/2024 | Rakotoarisoa | |
| 12,006,841 | B2 | 6/2024 | Postec | |
| 2007/0231153 | A1* | 10/2007 | Beckford | F01D 5/28 29/889.7 |
| 2011/0038732 | A1* | 2/2011 | Huth | F04D 29/324 427/299 |
| 2011/0052405 | A1 | 3/2011 | Parkin | |
| 2011/0206527 | A1* | 8/2011 | Harvey | F04D 29/324 416/223 R |
| 2016/0201607 | A1* | 7/2016 | Gallagher | F04D 29/053 415/144 |
| 2019/0331127 | A1* | 10/2019 | Foster | F04D 29/388 |

(Continued)

FOREIGN PATENT DOCUMENTS

| | | | |
|---|---|---|---|
| FR | 3114123 | A1 | 3/2022 |
| FR | 3117157 | B1 | 6/2022 |
| GB | 2164309 | A | 3/1986 |

*Primary Examiner* — Elton K Wong
(74) *Attorney, Agent, or Firm* — McGarry Bair PC

(57) ABSTRACT

A composite airfoil assembly for a turbine engine. The composite airfoil assembly includes a woven core having a core exterior. The woven core includes a first region, a second region, and a transition region. A skin is applied to at least a portion of the woven core at the core exterior.

18 Claims, 6 Drawing Sheets

(56) References Cited

U.S. PATENT DOCUMENTS

| | | | | |
|---|---|---|---|---|
| 2021/0372428 | A1* | 12/2021 | De Gaillard ....... | B29D 99/0025 |
| 2023/0119475 | A1 | 4/2023 | Pierre-Marie | |
| 2024/0035210 | A1* | 2/2024 | Jones ..................... | D03D 11/00 |

* cited by examiner

COMPOSITE AIRFOIL ASSEMBLY FOR A TURBINE ENGINE

TECHNICAL FIELD

The disclosure generally relates to a composite airfoil assembly, and more specifically, to a composite airfoil assembly for a turbine engine.

BACKGROUND

A turbine engine typically includes an engine core with a compressor section, a combustor section, and a turbine section in serial flow arrangement. A fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

With the advent of composite materials, composites have been used to make components of the turbine engine, especially in lower temperature regions, for example, the blades of the fan section. Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
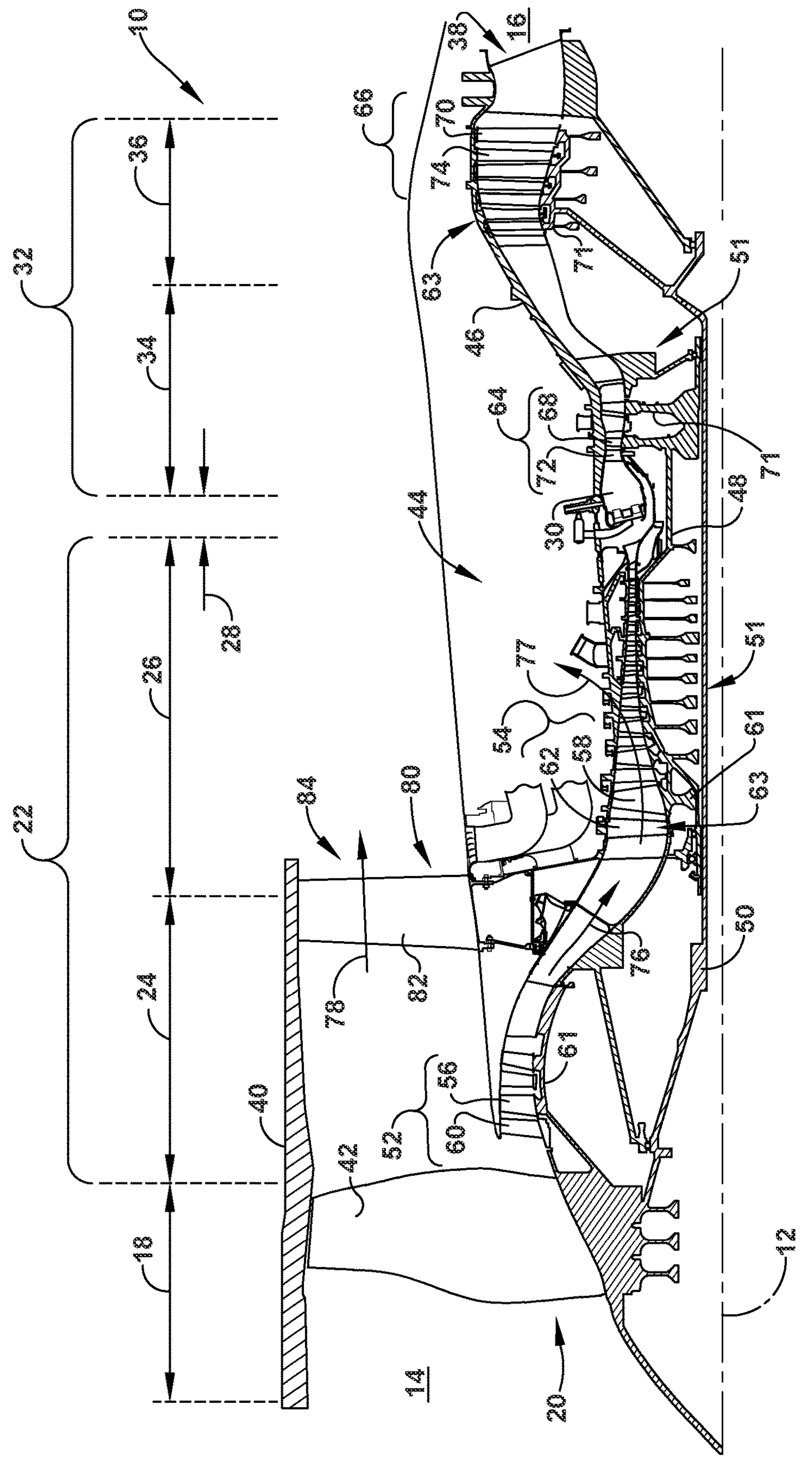
FIG. 1 is a schematic cross-sectional view of a turbine engine.

Aspects of the disclosure herein are directed to a composite component to be used in an engine component for a turbine engine. The composite component is illustrated as a composite airfoil assembly having a composite airfoil that includes at least a core and a skin, illustrated as a woven core and a laminate skin. The composite airfoil assembly can be located in the fan section of the turbine engine. The laminate skin has a skin outer surface, where a first part of the skin outer surface defines a first portion of an airfoil outer surface of the composite airfoil assembly.

The composite airfoil assembly benefits include a weight savings from the composite airfoil. The smooth airfoil outer surface provides fewer interruptions to air passing over the composite airfoil assembly. That is, the airfoil outer surface does not include a positive bump. Improved aerodynamics result in overall better airflow, which improves engine efficiency.

It should be understood that the disclosure applies to other engine components of the turbine engine, not just an airfoil, such as a disk or combustor liner, in non-limiting examples. Further, while described in terms of a core used in the manufacture of an airfoil, it will be appreciated that the present disclosure is applied to any other suitable environment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", or "fourth" may be used interchangeably to distinguish one component from another and are not intended to signify location or importance of the individual components.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "turbine engine" refers to an engine having a turbomachine as all or a portion of its power source. Example turbine engines include turbofan engines, turboprop engines, turbojet engines, turboshaft engines, etc., as well as hybrid-electric versions of one or more of these engines.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

As used herein, the terms “axial” and “axially” refer to directions and orientations that extend substantially parallel to a centerline of the turbine engine. Moreover, the terms “radial” and “radially” refer to directions and orientations that extend substantially perpendicular to the centerline of the turbine engine. For example, in the overall context of a turbine engine, radial refers to a direction along a ray extending between a center longitudinal axis of the engine and an outer engine circumference. In addition, as used herein, the terms “circumferential” and “circumferentially” refer to directions and orientations that extend arcuately about the centerline of the turbine engine.

The terms “coupled,” “fixed,” “applied to,” “attached to” and the like refer to both direct coupling, fixing, or attaching, as well as indirect coupling, fixing, or attaching through one or more intermediate components or features, unless otherwise specified herein.

All directional references (e.g., radial, axial, upper, lower, front, back, top, bottom, above, below, vertical, horizontal, clockwise, counterclockwise, upstream, downstream, forward, aft, etc.) are only used for identification purposes to aid the reader’s understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms “a”, “an”, and “the” include plural references unless the context clearly dictates otherwise. Furthermore, as used herein, the term “set” or a “set” of elements can be any number of elements, including only one.

As used herein, the term “stiffness” may be used as defining the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

The term “composite,” as used herein, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, polymeric resins, thermoplastics, bismaleimide (BMI) materials, polyimide materials, epoxy resins, glass fibers, and silicon matrix materials.

As used herein, a “composite” component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

In the present disclosure, when a layer is being described as “on” or “over” another layer or substrate, it is to be understood that the layers can either be directly contacting each other or have another layer or feature between the layers, unless expressly stated to the contrary. Thus, these terms are simply describing the relative position of the layers to each other and do not necessarily mean “on top of” since the relative position above or below depends upon the orientation of the device to the viewer.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic components (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers can be impregnated with a slurry composition prior to forming the preform or after formation of the preform. The preform may then undergo thermal processing and subsequent chemical processing, such as melt-infiltration with silicon, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

The reinforcing fibers can be at least portions of individual filaments or strands. As used herein, a "ceramic fiber tow," a "fiber tow," or simply a "tow" refers to a bundle of a plurality of individual fibers, filaments, or loose strands. The filaments of a tow may be randomly intermingled or arranged in a pattern, and/or may be continuous or non-continuous. For example, a tow may include broken filaments or filament segments. As another example, the filaments of a tow may be substantially parallel, twisted, or otherwise arranged. A tow may act substantially in the same manner as a single or individual filament. It will also be appreciated that an "individual ceramic filament," or simply an "individual filament," as used herein, refers to a singular or non-bundled elongate ceramic member.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many turbine components used in higher temperature sections of turbine engines, such as airfoils (e.g., turbine blades, and vanes), combustors, shrouds, and other like components, which would benefit from the lighter-weight and higher temperature capability these materials can offer.

The term "metallic" as used herein is indicative of a material that includes metal such as, but not limited to, titanium, iron, aluminum, stainless steel, brass, copper, and nickel alloys. A metallic material or alloy can be a combination of at least two or more elements or materials, where at least one is a metal. As used herein, the term "additive manufacturing" generally refers to manufacturing processes wherein a feedstock of material in a particulate powder or wire form aggregates to form a three-dimensional component. The feedstock material is then fused through the application of heat or other curing processes to form a monolithic unitary component, which can have a variety of integral sub-components. Monolithic, as used herein, refers to a unitary structure lacking interfaces or joints by virtue of the materials of each layer fusing to or melting with the materials of adjacent layers such that the individual layers lose their identity in the final unitary structure.

Suitable additive manufacturing techniques in accordance with the present disclosure include, for example, directed energy deposition (DED), fused deposition modeling (FDM), selective laser sintering (SLS), 3D printing such as by inkjets and laserjets, stereolithography (SLA), direct selective laser sintering (DSLS), electron beam sintering (EBS), electron beam melting (EBM), laser engineered net shaping (LENS), laser net shape manufacturing (LNSM), direct metal deposition (DMD), digital light processing (DLP), direct selective laser melting (DSLM), selective laser melting (SLM), direct metal laser melting (DMLM), and other known processes.

Digital light processing (DLP) can include a 3D DLP printer having a transparent vat or transparent tank, a building platform, and a light assembly. The transparent vat or transparent tank can contain, for example, a photopolymer resin.

The DLP building platform can couple to, for example, a motor or other mechanisms permitting the movement of the building platform in one or more dimensions, such as raising or lowering the building platform from or toward the resin in the vat or tank.

A DLP printed component can couple to a lower portion of the building platform facing the vat or tank. The lighting assembly is located, at least in part, below the vat or tank. The lighting assembly can include at least one light source and at least one optical reflector or refractor such as, for example, a deflection mirror or at least one lens.

A controller coupled to or included in the DLP printer can control one or more aspects of the DLP printer such as, for example, the position of the DLP building platform or the intensity, duration, or orientation of the lighting source.

In addition to using a direct metal laser sintering (DMLS), a direct metal laser melting (DMLM) process, or an electron beam melting (EBM) process, where an energy source is used to selectively sinter or melt portions of a layer of powder, it should be appreciated that according to alternative aspects of the present disclosure, the additive manufacturing process can be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent can be, for example, a photo-curable polymer or another liquid bonding agent. Other suitable additive manufacturing methods and variants are intended to be within the scope of the present subject matter.

FIG. 1 is a schematic cross-sectional diagram of a turbine engine, specifically an open rotor or turbine engine 10 for an aircraft. The turbine engine 10 has a generally longitudinally extending axis or engine centerline 12 extending from a forward end 14 to an aft end 16. The turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing, such as a nacelle 40, of the turbine engine 10 extends from the forward end 14 of the turbine engine 10 toward the aft end 16 of the turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the turbine engine 10, specifically, the fan section 18 extends radially outward from the nacelle 40. The fan section 18 includes a set of fan blades 42, and a set of stationary fan vanes 82 downstream the set of fan blades 42, both disposed radially about the engine centerline 12. The turbine engine 10 includes any number of one or more sets of rotating blades or propellers (e.g., the set of fan blades 42) disposed upstream of the set of stationary fan vanes 82. As a non-limiting example, the turbine engine 10 can include multiple sets of fan blades 42 or the set of stationary fan vanes 82. As such, the turbine engine 10 is further defined as an unducted single-fan turbine engine. The turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the turbine engine 10.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which collectively define a rotor 51.

It will be appreciated that the turbine engine 10 is either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are be mounted to the engine casing 46 in a circumferential arrangement.

Rotary portions of the turbine engine 10, such as the blades 56, 58 68, 70 among the compressor section 22 and the turbine section 32 are also referred to individually or collectively as the rotor 51. As such, the rotor refers to the combination of rotating elements throughout the turbine engine 10.

Complementary to the rotor portion, the stationary portions of the turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the turbine engine 10.

The nacelle 40 is operatively coupled to the turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the turbine engine 10.

During operation of the turbine engine 10, a freestream airflow 80 flows against a forward portion of the turbine engine 10. A portion of the freestream airflow 80 enters an annular area 25 defined by the swept area between the outer surface of the nacelle 40 and the tip of the blade, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the turbine engine 10.

The inlet airflow 78 flows through the set of fan blades 42 and over the nacelle 40 of the turbine engine 10. Subsequently, the inlet airflow 78 flows over at least a portion of the set of stationary fan vanes 82, which directs the inlet airflow 78 such that it is transverse toward the engine centerline 12. The inlet airflow 78 then flows past the set of stationary fan vanes 82, following the curvature of the nacelle 40 and toward the exhaust section 38. A pylon 84 mounts the turbine engine 10 to an exterior structure (e.g., a fuselage of an aircraft, a wing, a tail wing, etc.).

The working airflow 76 and at least some of the inlet airflow 78 merge downstream of the exhaust section 38 of the turbine engine 10. The working airflow 76 and the inlet airflow 78, together, form an overall thrust of the turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
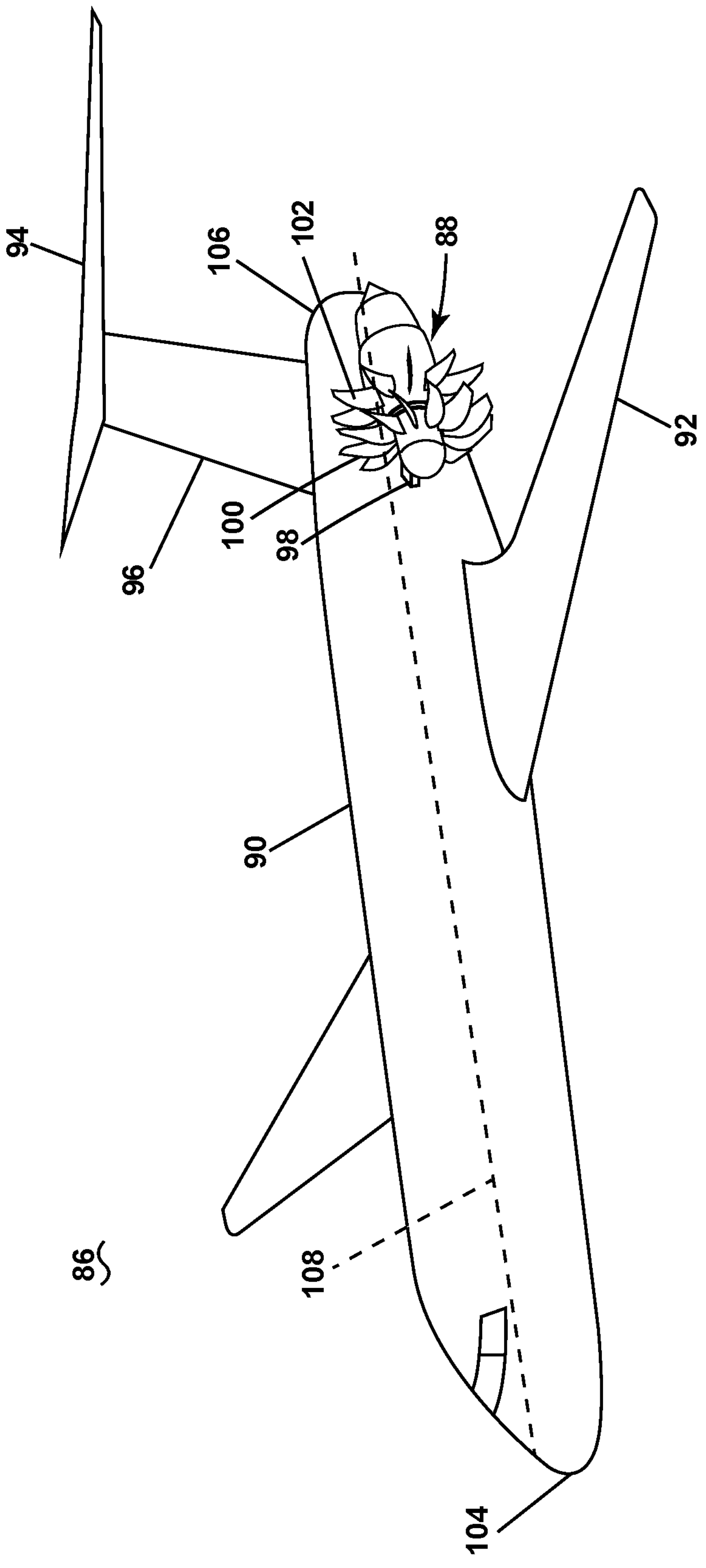
FIG. 2 is a schematic perspective view of an aircraft including an unducted or open rotor turbine engine.

FIG. 2 is a schematic perspective view of an aircraft 86 including a generic unducted turbine engine 88 suitable for use as the turbine engine 10 of FIG. 1. The aircraft 86 includes a fuselage 90 with an exterior surface. At least one wing 92 and a tail wing 94 extend from the fuselage 90. The tail wing 94 is operably coupled to and spaced from the fuselage 90 via a tail wing pylon 96. The unducted turbine engine 88 is operably coupled to the exterior surface of the fuselage 90 via a pylon 98. The unducted turbine engine 88 includes a set of circumferentially spaced fan blades 100. A set of stationary fan vanes 102 is provided downstream of the set of circumferentially spaced fan blades 100. The fuselage 90 extends between a nose 104 and a tail 106 and includes a fuselage centerline 108 extending therebetween.

Additionally, while the tail wing 94 is a T-wing tail wing (e.g., the tail wing 94 as illustrated), other conventional tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 94.

Figure 3:
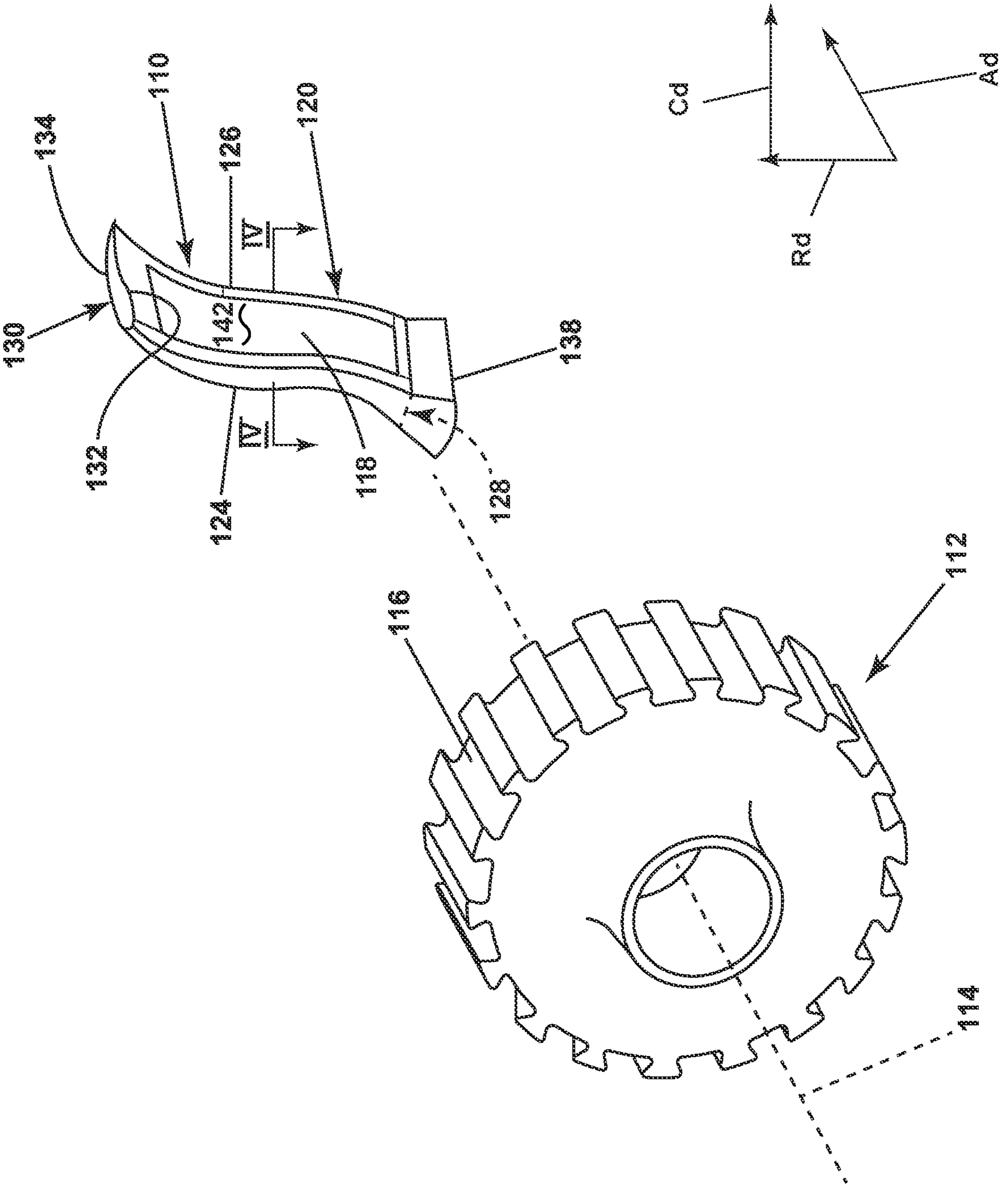
FIG. 3 is a schematic perspective view of a composite airfoil assembly and a disk assembly suitable for use within the turbine engine of FIG. 1 and FIG. 2, the composite blade assembly including a composite airfoil, cladding, and a dovetail, in accordance with an exemplary embodiment of the present disclosure.

FIG. 3 is a schematic perspective view of a composite airfoil assembly 110 and a disk assembly 112 suitable for use within the turbine engine 10 of FIG. 1 or the unducted turbine engine 88 of FIG. 2. The disk assembly 112 is suitable for use as the disk 61, 71 (FIG. 1) or any other disk such as, but not limited to, a disk within the fan section 18, the compressor section 22, or the turbine section 32 of the turbine engine 10. The composite airfoil assembly 110 can be rotating or non-rotating such that the composite airfoil assembly 110 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the set of fan blades 42 (FIG. 1). As a non-limiting example, the composite airfoil assembly 110 can be a composite fan blade assembly.

The disk assembly 112 can be rotatable or stationary about a rotational axis 114. The rotational axis 114 can coincide with or be offset from the engine centerline (e.g., the engine centerline 12 of FIG. 1). The disk assembly 112 includes a plurality of slots 116 extending axially through a radially outer portion of the disk assembly 112 and being circumferentially spaced about the disk assembly 112, with respect to the rotational axis 114.

The composite airfoil assembly 110 includes a composite airfoil 118 and a cladding 120. The composite airfoil 118 extends between a leading edge 124 and a trailing edge 126, opposite the leading edge 124, to define a chord-wise direction. The composite airfoil 118 extends between a root 128 and a tip 130 to define a span-wise direction. An airfoil outer surface 142 of the composite airfoil assembly 110 is defined by a pressure side 132 and a suction side 134, opposite the pressure side 132. The pressure side 132 and the suction side 134 extend radially in the radial direction from the root 128 to the tip 130. The suction side 134 can mirror the pressure side 132 and have the same surface area. However, it is contemplated that the surface area of the suction side can be less than or greater than the surface area of the pressure side 132.

The leading edge 124 and the trailing edge 126, extend radially from the root 128 to the tip 130. A dovetail portion 138 can extend from the composite airfoil 118.

The composite airfoil assembly 110 is coupled to the disk assembly 112 by inserting at least a portion of the dovetail portion 138 into a respective slot of the plurality of slots 116. The composite airfoil assembly 110 is held in place by frictional contact with the slot 116 or can be coupled to the slot 116 via any suitable coupling method such as, but not limited to, welding, adhesion, fastening, or the like. While only a single composite airfoil assembly 110 is illustrated, it will be appreciated that there can be any number of composite airfoils assemblies 110 coupled to the disk assembly 112. As a non-limiting example, there can be a plurality of composite airfoil assemblies 110 corresponding to a total number of slots of the plurality of slots 116.

For the sake of reference, a set of relative reference directions, along with a coordinate system can be applied to the composite airfoil assembly 110. A circumferential direction (Cd) can extend from forward to aft and is shown extending at least partially into the page. The circumferential direction (Cd) can be arranged parallel to the rotational axis 114. A radial direction (Rd) extends perpendicular to the circumferential direction (Cd) and can extend perpendicular to the engine centerline 12. An axial direction (Ad) can be defined perpendicular to the radial direction (Rd) and can be defined along the circumference of the turbine engine 10 (FIG. 1) relative to the engine centerline 12 (FIG. 1).

Figure 4:
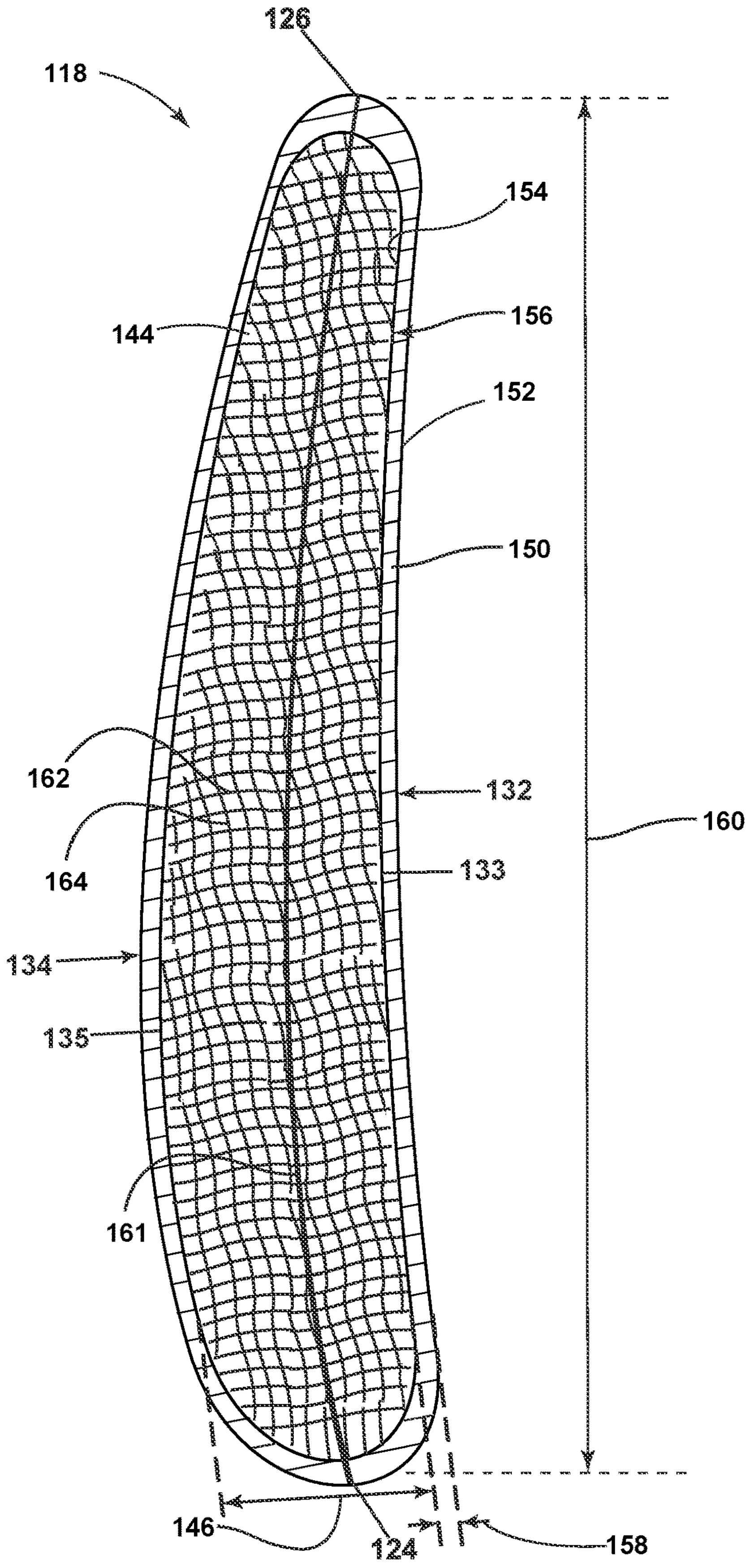
FIG. 4 is a schematic cross-sectional view taken along line IV-IV of FIG. 3 showing an interior of the composite airfoil assembly, including a woven core and laminate skin, in accordance with an exemplary embodiment of the present disclosure.

FIG. 4 is a schematic cross-sectional view taken along line IV-IV of FIG. 3 showing an interior of the composite airfoil 118, including a woven core 144 with a laminate skin 150. That is, FIG. 4 illustrates the cross section of the composite airfoil assembly 110 with the cladding 120 removed for ease of understanding.

The composite airfoil 118 includes a core, illustrated as woven core 144, and a skin, illustrated as laminate skin 150, wherein the laminate skin 150 is provided over the woven core 144. That is, the laminate skin 150 circumscribes or wraps around at least part of a core exterior 156, where the core exterior 156 is an exterior surface of the woven core 144.

The woven core 144 can be dry, with no additional materials, or alternatively, impregnated with a resin and cured in one non-limiting example. The woven core 144 can include a composite structure and/or be made of a woven structure. Such a woven structure can be a three-dimensional woven structure. More specifically, the woven structure can be woven in a combination of the circumferential direction (Cd), the radial direction (Rd), and the axial direction (Ad) (FIG. 3), while it should be appreciated that a weave pattern can be formed and defined separate from the turbine engine 10 (FIG. 1), such that the weave pattern is woven in any three, mutually-orthogonal planes in order to define a three-dimensional object relative to said planes. In one non-limiting example, the woven structure can include a three-dimensional weaving including a plurality of warp fibers 162 and a plurality of weft fibers 164 which can be woven in three directions to form a three-dimensional structure for the woven core 144. The three directions for the warp fibers 162 and weft fibers 164 can be defined along or angled relative to the circumferential direction (Cd), the radial direction (Rd), and the axial direction (Ad) (FIG. 3). In one non-limiting example, a Jacquard loom, or 3D weaving machine can be used to create complex three-dimensional woven structures, which can include interweaving one or more composites to form the woven core 144. The woven core 144 can be comprised of composite materials, such as carbon or carbon fibers, glass or glass fibers, nylon, rayon, poly-para-phenylene terephthalamide fibers or other aramid fibers, while other materials such as nickel, steel, titanium, metal fibers, or ceramic composites are also contemplated in non-limiting examples.

It is further contemplated that the woven core 144 can be formed as a three-dimensional woven structure, having a braided or a plaited geometry or pattern. A braided or a plaited geometry or pattern can include a weave pattern that includes three or more interlaced fibers that are woven in a repeating pattern, for example. In another non-limiting example, the braided geometry can include a set of fibers or strands that are sequentially laid over one another to define the braided geometry. The woven or braided geometry or pattern can repeat for the entirety of the woven core 144, or only a portion thereof. Such additional braided geometries can be similar, where the arrangement of the fibers is the same, but the orientation is different, or where the arrangement of the fibers is different, and the orientation can be similar or dissimilar. The braided geometry or pattern can be formed with a Jacquard loom or 3D weaving machine with composite materials. A three-dimensional braided structure can include a braided pattern that extends in three dimensions, such as a combination of the circumferential direction (Cd), the radial direction (Rd), and the axial direction (Ad) (FIG. 3).

The laminate skin 150 can be formed as a set of laminate layers, provided around or about the woven core 144. The laminate skin 150 can be pre-impregnated, fiber placed, or dry fiber laminate layers, in non-limiting examples. Such laminate layers forming the laminate skin 150 can be formed by resin transfer molding (RTM), partial RTM, same qualified resin transfer molding (SQRTM), or out-of-autoclave in non-limiting examples. The woven core 144 can be made from a different material than the laminate skin 150.

The laminate skin 150 can include a skin outer surface 152 and a skin inner surface 154. The skin inner surface 154 can, at least in part, be in contact with at least a portion of the core exterior 156 of the woven core 144. In other words, the laminate skin 150 can be applied to at least a portion of the core exterior 156 of the woven core 144.

A skin thickness 158 can be measured from the skin outer surface 152 to the skin inner surface 154. While illustrated as uniform, the skin thickness 158 can vary in the circumferential direction (Cd), the radial direction (Rd) or the axial direction (Ad) (FIG. 3).

An airfoil width 160 can be measured between the leading edge 124 and the trailing edge 126 of the composite airfoil 118. While illustrated as measured in the circumferential direction (Cd), it is contemplated, in a different and non-limiting example, that the airfoil width 160 can be measured as an average length, a weighted average, a minimum length, or a maximum length measured from the leading edge 124 and the trailing edge 126 of the composite airfoil 118 in the axial direction (Ad) or the circumferential direction (Cd). It is further contemplated, in yet another different and non-limiting example, that the airfoil width 160 can be measured along a mean camber line 161 extending from the leading edge 124 and the trailing edge 126, where the mean camber line is equidistant from the pressure side 132 and the suction side 134.

A woven core thickness 146 can be measured, for example, between a pressure surface 133 and a suction surface 135 of the woven core 144. The pressure surface 133 is a portion of the core exterior 156 facing the pressure side 132. The suction surface 135 is a portion of the core exterior 156 facing the suction side 134. The woven core thickness 146 can be in a range from 5% to 30% of the airfoil width 160. The range of the core thickness 146 provides a desired aerodynamic profile while maintaining a weight benefit.

The skin thickness 158 can be in range of from 1% to 40% of the woven core thickness 146. More specifically, the skin thickness 158 can be in a range from 2% to 30% of the woven core thickness 146.

Figure 5:
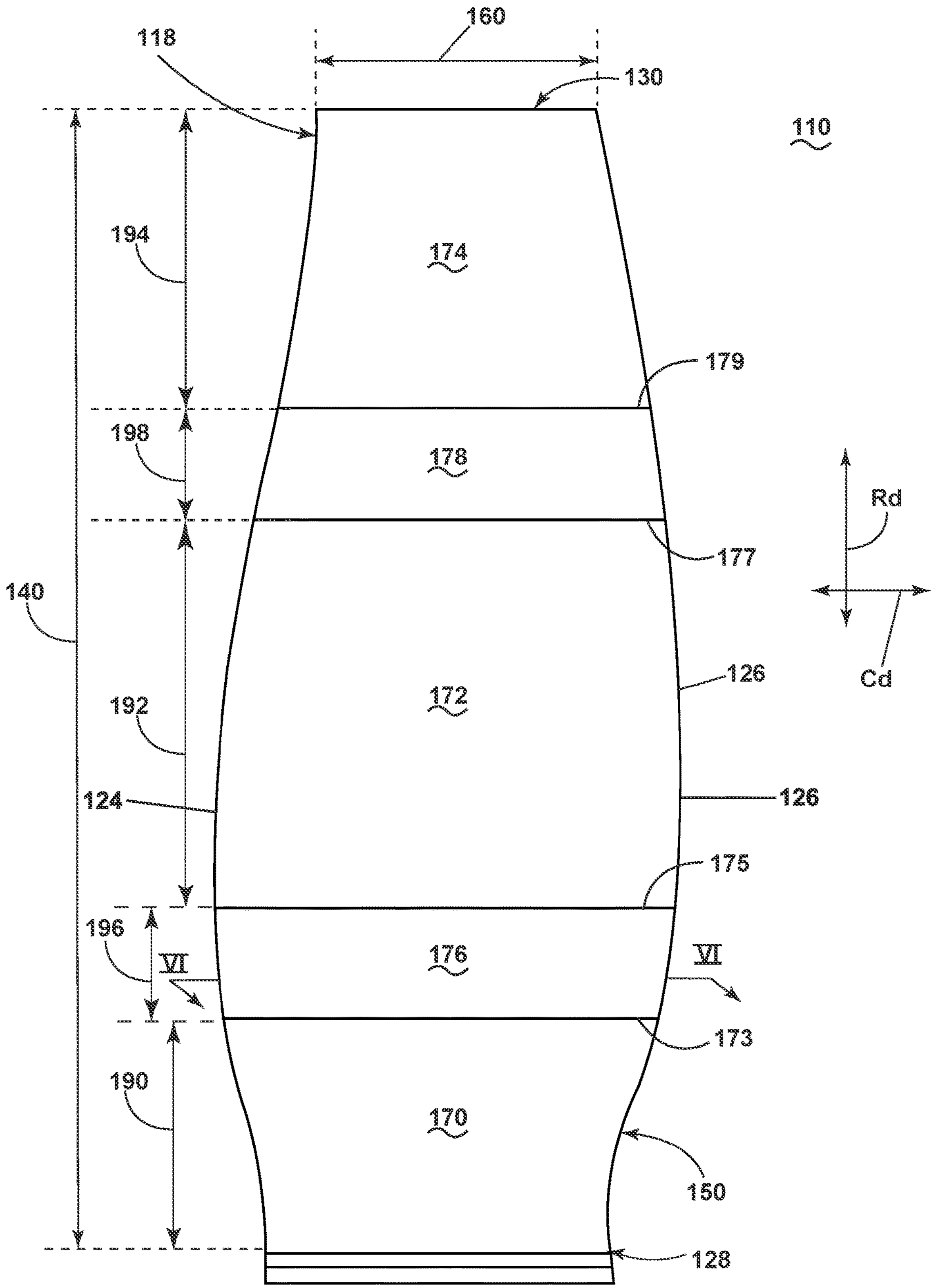
FIG. 5 is an enlarged view of the composite airfoil assembly of FIG. 3, in accordance with an exemplary embodiment of the present disclosure.

FIG. 5 is an enlarged view of the composite airfoil 118. That is, FIG. 5 is an enlarged view of the composite airfoil assembly 110 with the cladding 120 (FIG. 3) removed for ease of understanding. An airfoil length 140 can be measured from the root 128 to the tip 130 of the composite airfoil 118. The airfoil length 140 is illustrated, by way of example, as a maximum length measured from the root 128 to the tip 130. It is contemplated, in a different and non-limiting example, that the airfoil length 140 can be an average length, weighted average, or minimum length measured from the root 128 to the tip 130 of the composite airfoil 118 in the radial direction (Rd) defined from the root 128 to the tip 130.

The composite airfoil 118 can include a first region 170, a second region 172, a third region 174, a first transition region 176 located between the first region 170 and the second region 172, and a second transition region 178 located between the second region 172 and the third region 174. The first region 170 can include woven fibers formed from a first material. The first material can include one or more of carbon or carbon fibers, or non-carbon fibers such as glass or glass fibers, nylon, rayon, poly-para-phenylene terephthalamide fibers or other aramid fibers, nickel, steel, titanium, metal fibers, or ceramic composites.

The first region 170 has a first stiffness. The first stiffness is defined by material properties, one or more weave patterns, or the combination of material properties and one or more weave patterns that form the first portion of the woven core 144 (FIG. 4). Material properties can include, but are not limited to, material stiffness or modulus of elasticity, density of the material, or physical dimensions of the material.

It is contemplated that the first stiffness can be determined from or equal to a first material stiffness of the first material.

The first region 170 has a first length 190. The first length 190 can be measured from the root 128 to the first transition region 176 in the radial direction (Rd).

The second region 172 can include woven fibers formed from a second material. The second material can include one or more of carbon or carbon fibers, or non-carbon fibers such as glass or glass fibers, nylon, rayon, poly-para-phenylene terephthalamide fibers or other aramid fibers, nickel, steel, titanium, metal fibers or ceramic composites, where the second material is different than the first material. That is, the second region 172 includes at least one or more materials that are dissimilar to the first material in the first region 170.

The second region 172 has a second stiffness. The second stiffness is defined by material properties, one or more weave patterns, or the combination of material properties and one or more weave patterns that form the first portion of the woven core 144. The second stiffness is dissimilar to the first stiffness. That is, the first stiffness is greater than the second stiffness. However, it is contemplated in a different and non-limiting example, that the first stiffness can be less than the second stiffness.

It is contemplated that the second stiffness can be determined from or equal to a second material stiffness of the second material.

The second region 172 has a second length 192. The second length 192 can be measured from the first transition region 176 to the second transition region 178 in the radial direction (Rd).

The third region 174 can include woven fibers formed from a third material. The third material can include one or more of carbon or carbon fibers, or non-carbon fibers such as glass or glass fibers, nylon, rayon, poly-para-phenylene terephthalamide fibers or other aramid fibers, nickel, steel, titanium, metal fibers, or ceramic composites, where the third material is different than the second material. That is, the third region 174 includes at least one or more materials that are dissimilar to the second material in the second region 172.

The third region 174 has a third stiffness. The third stiffness is defined by material properties, one or more weave patterns, or the combination of material properties and one or more weave patterns that form the second portion of the woven core 144. The third stiffness is dissimilar to the second stiffness. That is, the second stiffness is greater than the third stiffness. However, it is contemplated in a different and non-limiting example, that the second stiffness can be less than the third stiffness. It is contemplated that the third stiffness can be determined from or equal to a third material stiffness of the third material.

The third region 174 has a third length 194. The third length 194 can be measured from the second transition region 178 to the tip 130 in the radial direction (Rd).

The first transition region 176 couples the first region 170 to the second region 172. That is, the first transition region 176 extends from the first region 170 to the second region 172. The first transition region 176 is defined as a portion of the composite airfoil 118 between the first region 170 and the second region 172 in which the stiffness is changing by more than 2% in the radial direction (Rd).

The first transition region 176 can include the first material and the second material. That is, the first transition region 176 is the portion of the composite airfoil 118 in which the fibers of the woven core 144 (FIG. 4) are interwoven and transition from the first material to the second material.

By way of non-limiting example, the first material can be coupled with the second material. Coupling can include, but is not limited to, one or more of intertwining, interweaving, twisting, abutting, fastening, braiding, circumscribing, splicing, plaiting, or crossing of the first material and the second material. The coupling of the first material and the second material in the first transition region 176 can create a gradual change in stiffness along the transition length 196 between a first radially inner boundary 173 and a first radially outward boundary 175. The first radially inner boundary 173 is located at an intersection of the first region 170 and the first transition region 176. The first radially outward boundary 175 is located at an intersection of the first transition region 176 and the second region 172. It is contemplated, in a different and non-limiting example, that the gradual change in stiffness can be in any direction along or angled relative to one or more of the circumferential direction (Cd), the radial direction (Rd), or the axial direction (Ad) (FIG. 3) between the first radially inner boundary 173 and the first radially outward boundary 175. While illustrated as generally linear, the first radially inner boundary 173 and/or the first radially outward boundary 175 can includes contours in one or more of the circumferential direction (Cd), the radial direction (Rd), or the axial direction (Ad) (FIG. 3)

The transition length 196 can be measured from the first region 170 to the second region 172 in the radial direction (Rd). The transition length 196 can be in a range from 1% to 200% of the first length 190 or the second length 192. As illustrated, by way of example, the transition length 196 can be less than the first length 190 or the second length 192. That is, the transition length 196 can be in a range from 1% to less than 100% of the first length 190 or the second length 192. Alternatively, in a different and non-limiting example, the transition length 196 can be equal to or greater than the first length 190 or the second length 192. That is, the transition length 196 can be in a range from 100% to 200% of the first length 190 or the second length 192.

While the stiffness changes in the first transition region 176, it is contemplated that the first transition region 176 can have an average stiffness in a range between the first stiffness of first region 170 and the second stiffness of the second region 172. The first transition region 176 provides for a stiffness transition between the first region 170 and the second region 172.

By way of non-limiting example, average stiffness can be calculated by averaging stiffnesses measured at pre-determined intervals across the transition length 196 and/or from the first radially inner boundary 173 and the first radially outward boundary 175. By way of further non-limiting example, the average can be calculated by averaging the stiffness at the first radially inner boundary 173 and the first radially outward boundary 175.

The second transition region 178 couples the second region 172 to the third region 174. That is, the second transition region 178 extends from the second region 172 to the third region 174 in the radial direction (Rd). The second transition region 178 is defined as a portion of the composite airfoil 118 between the second region 172 and the third region 174 in which the stiffness is changing by more than 2% in the radial direction (Rd).

The second transition region 178 can include the second material and the third material. That is, the second transition region 178 is the portion of the composite airfoil 118 in which the fibers of the woven core 144 (FIG. 4) are interwoven and transition from the second material to the third material.

By way of non-limiting example, the second material can be coupled with the third material. Coupling can include, but is not limited to, one or more of intertwining, interweaving, twisting, abutting, fastening, braiding, circumscribing, splicing, plaiting, or crossing of the first material and the second material. The coupling of the second material and the third material in the second transition region 178 can create a gradual change in stiffness, for example, along the transition length 198 between a second radially inner boundary 177 and a second radially outward boundary 179. The second radially inner boundary 177 is located at an intersection of the second region 172 and the second transition region 178. The second radially outward boundary 179 is located at an intersection of the second transition region 178 and the third region 174. It is contemplated, in a different and non-limiting example, that the gradual change in stiffness can be along or angled relative to one or more of the circumferential direction (Cd), the radial direction (Rd), or the axial direction (Ad) (FIG. 3) between the second radially inner boundary 177 and the second radially outward boundary 179. While illustrated as generally linear, the second radially inner boundary 177 and/or the second radially outward boundary 179 can includes contours in one or more of the circumferential direction (Cd), the radial direction (Rd), or the axial direction (Ad) (FIG. 3)

The transition length 198 can be measured from the second region 172 to the third region 174 in the radial direction (Rd). The transition length 198 can be in a range from 1% to 200% of the first length 190, the second length 192, or the third length 194. As illustrated, by way of example, the transition length 198 can be less than the first length 190, the second length 192, or the third length 194. That is, the transition length 198 can be in a range from 1% to less than 100% of the first length 190, the second length 192, or the third length 194. Alternatively, in a different non-limiting example, the transition length 198 can be equal to or greater than the first length 190, the second length 192, or the third length 194. That is, the transition length 198 can be in a range from 100% to 200% of the first length 190, the second length 192, or the third length 194.

While the stiffness changes in the second transition region 178, it is contemplated that the second transition region 178 can have an average stiffness in a range between the second stiffness of the second region 172 and the third stiffness of the third region 174. The second transition region 178 provides for a stiffness transition between the second region 172 and the third region 174.

By way of non-limiting example, average stiffness can be calculated by averaging stiffnesses measured at pre-determined intervals across the transition length 198 and/or from the second radially inner boundary 177 and the second radially outward boundary 179. By way of further non-limiting example, the average can be calculated by averaging the stiffness at the second radially inner boundary 177 and the second radially outward boundary 179.

The gradual change in stiffness, which can be a smooth change or a stepped change in stiffness, of the first transition region 176 or the second transition region 178 can decrease fatigue and increase the life of the composite airfoil. Further, the smooth change in stiffness can increase distribution of energy from an impact event throughout the composite airfoil.

Figure 6:
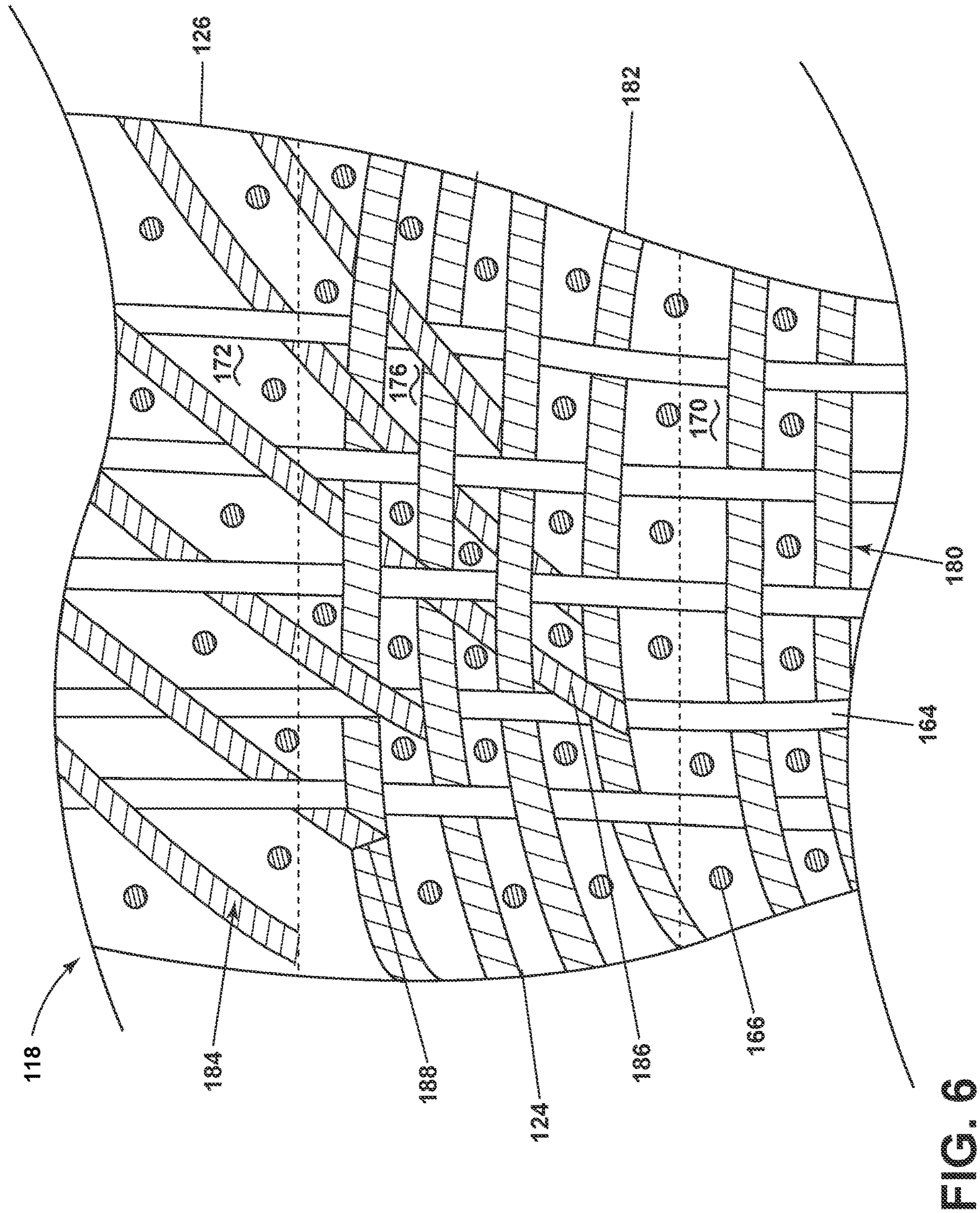
FIG. 6 is an enlarged schematic cross-section of a portion of the composite airfoil taken along line VI-VI of FIG. 5, including a portion of the first region, the first transition region, and a portion of the second region, in accordance with an exemplary embodiment of the present disclosure.

FIG. 6 is an enlarged schematic cross-section of a portion of the composite airfoil 118 taken along line VI-VI of FIG. 5, further illustrating a portion of the first region 170, the first transition region 176, and a portion of the second region 172.

A first set of warp fibers 180 include the first material. The first set of warp fibers 180 are located in the first region 170, in the first transition region 176, or the first region 170 and the first transition region 176. As illustrated, by way of example, a subset 182 of the first set of warp fibers 180 are located in the first transition region 176 or extend from the first region 170 into the first transition region 176.

The first set of warp fibers 180 are illustrated, by way of example, as extending from the leading edge 124 to the trailing edge 126. However, it is contemplated in a different and non-limiting example that the first set of warp fibers 180 can be defined along or angled relative to one or more of the circumferential direction (Cd), the radial direction (Rd), or the axial direction (Ad) (FIG. 3).

The first region 170 has a first weave pattern. By way of non-limiting example, the first weave pattern can include a portion of the first set of warp fibers 180 that extend from the leading edge 124 to the trailing edge 126 and are located in a perpendicular plane to the plurality of weft fibers 164. The first set of warp fibers 180 can weave in an alternating pattern over and under a set of through thickness fibers 166 forming the first weave pattern. While illustrated as patterned, the first weave pattern can have any weave pattern, or overlap, coupling, or wrapping of the first set of warp fibers 180, the plurality of weft fibers 164, and the set of through thickness fibers 166. The first set of warp fibers 180, the plurality of weft fibers 164, and the set of through thickness fibers 166 are woven or otherwise combined in three dimensions to form a three-dimensional structure for the woven core 144.

The first weave pattern has a warp to weft ratio. The warp to weft ratio in the first weave pattern can be in a range of 40:60 to 60:40.

A second set of warp fibers 184 include the second material. The second set of warp fibers 184 are located in the second region 172, in the first transition region 176, or the second region 172 and the first transition region 176. As illustrated, by way of example, a subset 186 of the second set of warp fibers 184 extend into or are located in the first transition region 176.

The second set of warp fibers 184 are illustrated as angled with respect to the leading edge 124 to the trailing edge 126. However, it is contemplated in a different and non-limiting example that the second set of warp fibers 184 can be defined along or angled relative to one or more of the circumferential direction (Cd), the radial direction (Rd), or the axial direction (Ad) (FIG. 3).

The second region 172 has a second weave pattern. In a non-limiting example, a portion of the second set of warp fibers 184 can extend at an angle from the leading edge 124 to the trailing edge 126, such that the second set of warp fibers 184 are angled and woven over then under the plurality of weft fibers 164, or over then under the set of through thickness fibers 166. The second set of warp fibers 184 are illustrated, by way of example, as located in a perpendicular plane to the plurality of weft fibers 164. While illustrated as random, the second weave pattern can have any weave pattern, or overlap, coupling, or wrapping of the second set of warp fibers 184, the plurality of weft fibers 164, and the set of through thickness fibers 166. The second set of warp fibers 184, the plurality of weft fibers 164, and the set of through thickness fibers 166 are woven or otherwise combined in three dimensions to form a three-dimensional structure for the woven core 144.

The second weave pattern has a warp to weft ratio. The warp to weft ratio of the second weave pattern can be in a range of 40:60 to 60:40.

The plurality of weft fibers 164 are illustrated, by way of example, as being generally made of the same material. It is contemplated that the plurality of weft fibers 164 can have a first plurality of weft fibers including the first material and a second plurality of weft fibers including the second material, where the transition from the first plurality of weft fibers to the second plurality of weft fibers can happen in a transition zone similar to that of the first set of warp fibers 180 and the second set of warp fibers 184 transition in the first transition region 176.

The set of through thickness fibers 166 are illustrated, by way of example, as being generally made of the same material. It is contemplated that the set of through thickness fibers 166 can have a first set of through thickness fibers made of the first material and a second set of through thickness fibers made of the second material, where the transition from the first set of through thickness fibers to the second set of through thickness fibers can happen in a transition zone similar to that of the first set of warp fibers 180 and the second set of warp fibers 184 transition in the first transition region 176.

The first transition region 176 has a transition weave pattern. The transition weave pattern can include at least portions of the first weave pattern and the second weave pattern. However, it is contemplated in a different and non-limiting example, that the subset 182 of the first set of warp fibers 180, the subset 186 of the second set of warp fibers 184, the plurality of weft fibers 164, and the set of through thickness fibers 166 can have a weave pattern different than the first weave pattern or the second weave pattern.

The transition weave pattern can have an average warp to weft ratio, as the warp to weft ratio can vary in the radial direction (Rd), the circumferential direction (Cd), or the axial direction (Ad). The average warp to weft ratio in the first transition region 176 can be in a range from 40:60 to 60:40 in the radial direction (Rd).

An intersection 188 is formed when at least one fiber of the first set of warp fibers 180 couples to or crosses at least one fiber of the second set of warp fibers 184. Coupling can include, but is not limited to, one or more of intertwining, interweaving, twisting, abutting, fastening, braiding, circumscribing (wrapped around), splicing, plaiting, or crossing the at least one fiber of the subset 182 of first set of warp fibers 180 and the at least one fiber of the subset 186 of second set of warp fibers 184.

It is contemplated that the intersection 188 can define a coupling site between the first weave pattern and the second weave pattern.

The intersection 188 of the fibers or the weave pattern can provide control of where energy is transferred within the composite airfoil 118 during an impact event.

The transition weave pattern can have a warp to weft ratio. In a non-limiting example, the warp to weft ratio can vary in the radial direction (Rd) or from the circumferential direction (Cd), but it is contemplated that the warp to weft ratio can vary in any direction.

Benefits associated with the first transition region 176 and the second transition region 178 as described herein include the ability to tune the frequency of the composite airfoil assembly 110 (FIG. 5). Tuning the frequency of the composite airfoil assembly 110 can increase part life and reduce fatigue.

Changing materials in the first transition region 176 or the second transition region 178 smooths the stiffness transitions. A smooth transition in stiffness from one zone or region to another can improve and control the dispersion of energy, for example, during an impact event.

Changing weave patterns in the first transition region 176 or the second transition region 178 can also provide smoothing in the stiffness transition from the first region 170 to the second region 172 or from the second region 172 to the third region 174.

Additional benefits include an ability to have increased control of frangibility zones by changing the stiffness via a change in material or weave pattern of the composite airfoil 118 such that the composite airfoil 118 bends, deforms, or separates at a predetermined desired location during an ingestion event.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A composite airfoil assembly for a turbine engine, the composite airfoil assembly comprising a woven core comprising a woven core comprising a first region of the woven core comprising a first material having a first stiffness, a second region of the woven core comprising a second material having a second stiffness, with the second stiffness different from the first stiffness, and a transition region coupling the first region and the second region, the transition region having the first material and the second material, and a skin applied to at least a portion of the core exterior.

The composite airfoil assembly of any preceding clause, wherein the first stiffness is greater than the second stiffness.

The composite airfoil assembly of any preceding clause, wherein the first material is different from the second material.

The composite airfoil assembly of any preceding clause, wherein the first stiffness of the first material is greater than the second stiffness of the second material.

The composite airfoil assembly of any preceding clause, wherein the first region has a first length measured in a radial direction, and the transition region has a transition length measured in the radial direction, wherein the transition length in a range from 1% to 200% of the first length or the second length.

The composite airfoil assembly of any preceding clause, further comprising a third region having a third material different than the first material and the second material and a third stiffness different from the first stiffness and the second stiffness.

The composite airfoil assembly of any preceding clause, wherein the transition region is a first transition region, and the composite airfoil assembly further comprises a second transition region coupling the third region and the second region, wherein the second transition region includes the first material and the second material.

The composite airfoil assembly of any preceding clause, wherein the stiffness of the first transition region and the second transition region changes by more than 2% in the radial direction across the transitional length of each of the first transition region and the second transition region.

The composite airfoil assembly of any preceding clause, wherein the woven core includes a three-dimensional weave pattern.

The composite airfoil assembly of any preceding clause, wherein the first material or the second material includes carbon fibers.

The composite airfoil assembly of any preceding clause, wherein the first material or the second material includes metal fibers.

The composite airfoil assembly of any preceding clause, wherein the first material or the second material includes non-carbon fibers.

The composite airfoil assembly of any preceding clause, wherein the skin is a laminate having a skin thickness measured from a skin inner surface to a skin outer surface.

The composite airfoil assembly of any preceding clause, wherein the woven core has a woven core thickness, wherein the woven core thickness is measured from a pressure surface to a suction surface.

The composite airfoil assembly of any preceding clause, wherein the skin thickness is in a range from 1% to 40% of the woven core thickness.

The composite airfoil assembly of any preceding clause, wherein the woven core thickness is in a range from 5% to 30% of an airfoil width of the composite airfoil assembly.

The composite airfoil assembly of any preceding clause, wherein the first material and the second material are coupled within the transition region, wherein coupling includes one or more of intertwining, interweaving, twisting, abutting, fastening, braiding, wrapping around, splicing, plaiting, or crossing of the first material and the second material.

The composite airfoil assembly of any preceding clause, wherein the transition region includes an intersection defined by the first material coupling to the second material, wherein the coupling of the first material and the second material includes one or more of intertwining, interweaving, twisting, abutting, fastening, braiding, wrapping around, splicing, plaiting, or crossing of the first material and the second material.

The composite airfoil assembly of any preceding clause, wherein the first material and the second material are interwoven within the transition region.

The composite airfoil assembly of any preceding clause, wherein the first material and the second material include the same material.

The composite airfoil assembly of any preceding clause, wherein the first material has a first weave pattern in the first region and the second material has a second weave pattern in the second region, wherein the first weave pattern is different than the second weave pattern.

The composite airfoil assembly of any preceding clause, wherein the transition region has a transition weave pattern, wherein the transition weave pattern includes at least portions of the first weave pattern and the second weave pattern.

The composite airfoil assembly of any preceding clause, wherein the transition weave pattern has an intersection, wherein the intersection includes a coupling site between the first weave pattern and the second weave pattern, wherein coupling includes one or more of intertwining, interweaving, twisting, abutting, fastening, braiding, circumscribing, splicing, plaiting, or crossing of the first weave pattern and the second weave pattern.

What is claimed is:

1. A composite airfoil assembly for a turbine engine, the composite airfoil assembly comprising:

a composite airfoil extending between a leading edge and a trailing edge, the composite airfoil comprising:

an airfoil width measured from the leading edge to the trailing edge;

a woven core defining a core exterior, the woven core comprising:

a woven core thickness measured between a pressure surface and a suction surface of the woven core, wherein the woven core thickness is in a range from 5% to 30% of the airfoil width;

a first region comprising a first material having a first stiffness;

a second region comprising a second material having a second stiffness, with the second stiffness different from the first stiffness; and a transition region coupling the first region and the second region, the transition region including the first material and the second material; and a skin applied to at least a portion of the core exterior.

2. The composite airfoil assembly of claim 1, wherein the first stiffness is greater than the second stiffness.

3. The composite airfoil assembly of claim 2, wherein the first stiffness of the first region is greater than the second stiffness of the second region.

4. The composite airfoil assembly of claim 1, wherein the first region has a first length measured in a radial direction, the second region has a second length measured in the radial direction, and the transition region has a transition length measured in the radial direction, wherein the transition length is in a range from 1% to 200% of the first length or the second length.

5. The composite airfoil assembly of claim 1, further comprising a third region having a third material different than the first material and the second material and a third stiffness different from the first stiffness and the second stiffness.

6. The composite airfoil assembly of claim 5, wherein the transition region is a first transition region, and the composite airfoil assembly further comprises a second transition region coupling the second region and the third region, wherein the second transition region includes the second material and the third material.

7. The composite airfoil assembly of claim 6, wherein a stiffness of each of the first transition region and the second transition region changes by more than 2% in a radial direction across a transitional length of each of the first transition region and the second transition region.

8. The composite airfoil assembly of claim 1, wherein the woven core includes a three-dimensional weave pattern.

9. The composite airfoil assembly of claim 1, wherein the first material or the second material includes carbon fibers.

10. The composite airfoil assembly of claim 1, wherein the first material or the second material includes metal fibers.

11. The composite airfoil assembly of claim 1, wherein the first material or the second material includes non-carbon fibers.

12. The composite airfoil assembly of claim 1, wherein the skin is a laminate skin having a skin thickness measured from a skin inner surface to a skin outer surface.

13. The composite airfoil assembly of claim 12, wherein the skin thickness is in a range from 1% to 40% of the woven core thickness.

14. The composite airfoil assembly of claim 1, wherein the first material and the second material are coupled within the transition region, wherein coupling includes one or more of intertwining, interweaving, twisting, abutting, fastening, braiding, wrapping around, splicing, plaiting, or crossing of the first material and the second material.

15. The composite airfoil assembly of claim 1, wherein the transition region includes an intersection defined by the first material coupling to the second material, wherein the coupling of the first material and the second material includes one or more of intertwining, interweaving, twisting, abutting, fastening, braiding, wrapping around, splicing, plaiting, or crossing of the first material and the second material.

16. The composite airfoil assembly of claim 1, wherein the first material and the second material are interwoven within the transition region.

17. The composite airfoil assembly of claim 1, wherein the first material has a first weave pattern in the first region and the second material has a second weave pattern in the second region, wherein the first weave pattern is different than the second weave pattern.

18. The composite airfoil assembly of claim 17, wherein the transition region has a transition weave pattern, wherein the transition weave pattern includes at least portions of the first weave pattern and the second weave pattern.

* * * * *